(12) United States Patent
Osada et al.

(10) Patent No.: US 6,605,921 B2
(45) Date of Patent: Aug. 12, 2003

(54) ELECTRIC POWER SUPPLY SYSTEM FOR ENGINE STARTERS

(75) Inventors: Masahiko Osada, Okazaki (JP); Mikio Saito, Motosu-gun (JP); Masaru Kamiya, Toyoake (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/188,792

(22) Filed: Jul. 5, 2002

(65) Prior Publication Data

US 2003/0042873 A1 Mar. 6, 2003

(30) Foreign Application Priority Data

Aug. 31, 2001 (JP) ........................................ 2001-263394

(51) Int. Cl.[7] .................................................. H02J 7/00
(52) U.S. Cl. ..................................................... 320/104
(58) Field of Search ................................ 320/104, 116, 320/117, 126, 127; 307/64–66, 40.7, 10.1, 10.6, 46, 48, 80–87; 290/27, 28, 304, 32, 47, 56

(56) References Cited

U.S. PATENT DOCUMENTS 6,057,666 A * 5/2000 Dougherty et al. ......... 320/104
6,097,973 A * 8/2000 Rabe et al. ................. 320/166
6,157,165 A * 12/2000 Kinoshita et al. ........... 320/116
6,380,712 B2 * 4/2002 Murphy et al. ............. 320/104
6,392,348 B1 * 5/2002 Dougherty ................... 322/90

FOREIGN PATENT DOCUMENTS

| JP | A 2-245446 | 10/1990 |
| JP | 6-25557 U | 4/1994 |
| JP | 6-29301 U | 4/1994 |
| JP | A 11-107892 | 4/1999 |
| JP | B2 2178486 | 4/2001 |

* cited by examiner

*Primary Examiner*—Edward H. Tso
*Assistant Examiner*—Pia Tibbits
(74) *Attorney, Agent, or Firm*—Oliff & Berridge, PLC

(57) ABSTRACT

An electric power supply system for a starter comprises a capacitor. This capacitor is charged by a battery through a charging circuit including resistors that charges the capacitor by dividing a voltage of the battery by the resistors. This capacitor is discharged to the starter through a discharge circuit that applies to the starter a charged voltage of the capacitor in addition to the voltage of the battery. When the starter is driven, the connection of the capacitor is switched from the charging circuit to the discharging circuit by an ECU and switching relays.

5 Claims, 2 Drawing Sheets

ELECTRIC POWER SUPPLY SYSTEM FOR ENGINE STARTERS

CROSS REFERENCE TO RELATED APPLICATION

This application relates to and incorporates herein by reference Japanese Patent Application No. 2001-263394 filed Aug. 31, 2001.

FIELD OF THE INVENTION

The present invention relates to an electric power supply system for engine starters, that uses a battery and a capacitor.

BACKGROUND OF THE INVENTION

An engine starter motor requires a large starting current when driven to start a vehicle engine. This large starting current lowers the voltage of a battery in a vehicle, necessitating prolongation of period of driving the starter motor. In a vehicle having an economy-running system (idle-stopping system) which automatically stops engine operation at traffic lights or traffic congestion for fuel economy and reduced exhaust emission, the decrease in the battery voltage when driving the starter motor for engine restarting also adversely affects electric accessory devices such as a navigation device and an audio device in the vehicle.

It is proposed to provide an electric power source (capacitor) exclusively for the starter motor in addition to the battery or a back-up power source (capacitor) for each electric device in the vehicle. However, a plurality of capacitors needs to be provided for each of the starter and the electric devices, because each capacitor has only limited capacitance. As a result, the electric power source must be sized large and a control unit for charging each capacitor evenly becomes complicated, resulting in increase in cost.

SUMMARY OF THE INVENTION

It is therefore an object of the present invention to provide an electric power supply system for engine starters that compensate for a decrease in battery voltage by a small capacitor.

According to the present invention, an electric power supply system for a starter comprises a capacitor. This capacitor is charged by a battery through a charging circuit including resistors that charges the capacitor by dividing a voltage of the battery by the resistors. This capacitor is discharged to the starter through a discharge circuit that applies to the starter a charged voltage of the capacitor in addition to the voltage of the battery. When the starter is driven, the connection of the capacitor is switched from the charging circuit to the discharging circuit.

Preferably, the charging circuit includes a series resistor that is connected to the battery in series with the capacitor to limit a charging current to the capacitor, and a parallel resistor that is connected in parallel with the capacitor and in series with the series resistor to divide the voltage of the battery applied to the capacitor. The resistors have respective resistances that define a voltage dividing ratio which provides a capacitor voltage that compensates for a decrease in the voltage of the battery at the time of starting an engine.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Figure 1:
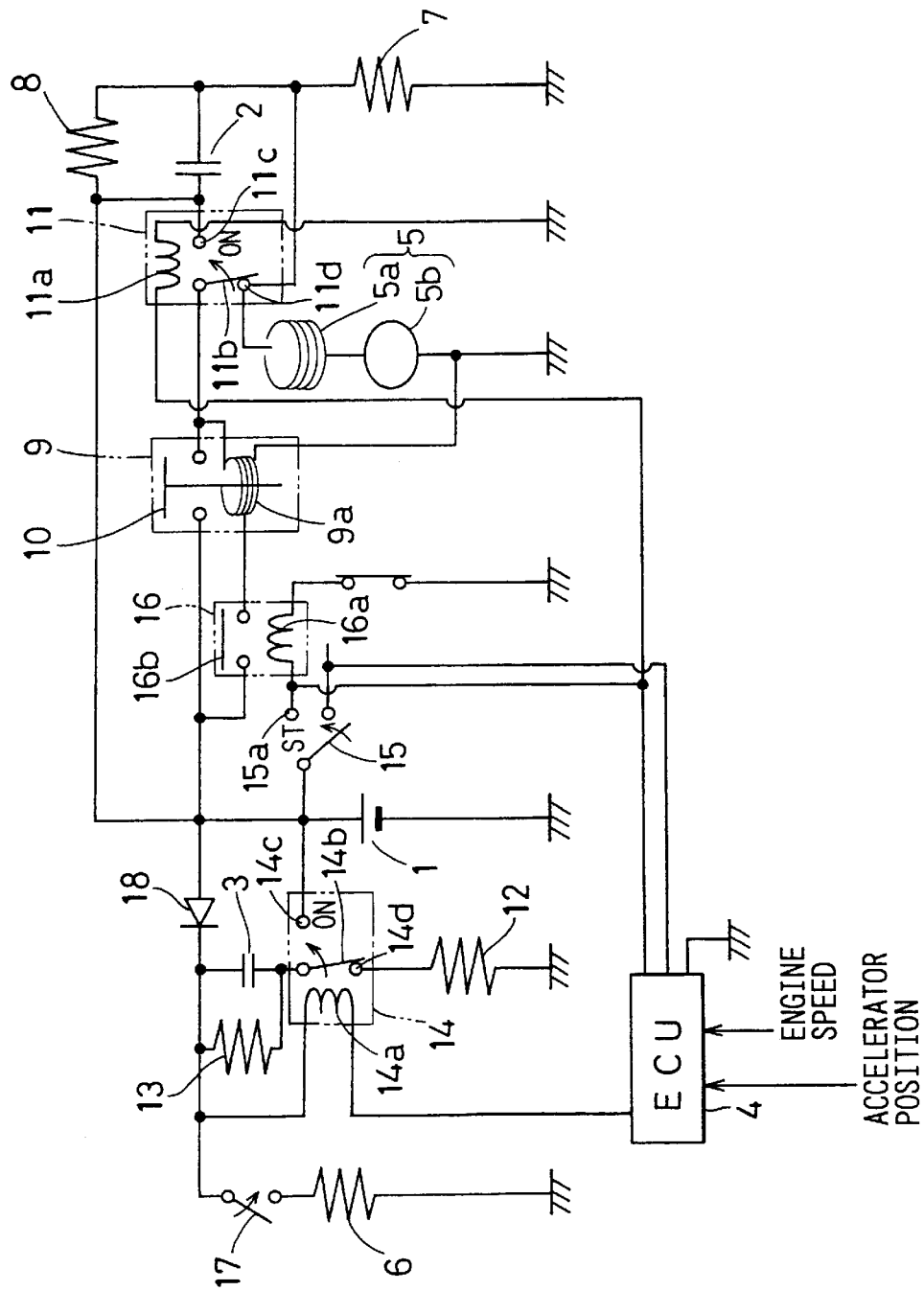
FIG. 1 is a circuit diagram showing an electric power supply system for an engine starter.

An electric power supply system for engine starters shown in FIG. 1 is mounted in a vehicle having an economy-running system. The economy-running system automatically stops vehicle engine operation for rest at intersections or in heavy traffic congestion, and thereafter automatically drive a starter motor to restart the vehicle engine operation. This power supply system has, in addition to a storage battery 1, a first capacitor 2, a second capacitor 3, an electronic control unit (ECU) 4 which controls the economy-running system, a starter motor (electric load) 5 for driving an engine (not shown), and other electric circuits. The starter has a field coil 5a and an armature coil 5b, and is connected to an electro-magnetic switch 9.

The first capacitor 2 is provided for supplying electric power to the starter motor 5. This capacitor 2 is connected to a first charging circuit that charges the capacitor 2 by the battery 1. The capacitor 2 is also connected to a first discharging circuit that applies the capacitor voltage of the capacitor 2 to the starter motor 5 by discharging the stored charge of the capacitor 2 in addition to the voltage of the battery 1.

The first charging circuit has resistors 7 and 8 connected in series with the battery 1. The resistor 7 is connected in series with the capacitor 2 to limit the charging current of the capacitor 2. The resistor 8 is connected in parallel with the capacitor 2 to determine the charge voltage of the capacitor 2 by dividing the battery voltage with the resistor 7.

The first discharging circuit has a first switching relay 11 that connects the battery 1 and the first capacitor 2 to the starter motor 5 in series. This discharging circuit discharges the stored charge of the capacitor 2 to the starter motor 5, when the electromagnetic switch 9 and the first switching relay 11 are turned on, that is, when a motor contact 10 is turned on by energization of a solenoid coil 9a in the electromagnetic switch 9 and a relay contact 11b is turned on to an ON terminal 11c by energization of a relay coil 11a in the first switching relay 11.

The second capacitor 3 is provided for supplying electric power to an electric device (electric load) 6 such as a navigation device or an audio device. This capacitor 3 is connected to a second charging circuit that charges the capacitor 3 by the battery 1. The capacitor 3 is also connected to a second discharging circuit that applies the capacitor voltage of the capacitor 3 to the electric device 6 by discharging the stored charge of the capacitor 3 in addition to the voltage of the battery 1.

The second charging circuit has resistors 12 and 13 connected in series with the battery 1. The resistor 12 is connected in series with the capacitor 3 to limit the charging current of the capacitor 3. The resistor 13 is connected in parallel with the capacitor 3 to determine the charge voltage of the capacitor 3 by dividing the battery voltage with the resistor 12.

The second discharging circuit has a second switching relay 14 that connects the battery 1 and the second capacitor 3 to the electric device 6 in series through a device switch 17, when the second switching relay 14 is turned on, that is, when a relay contact 14b is turned on to an ON terminal 14c by energizing a relay coil 14a in the second switching relay 14.

The voltage dividing ratios between the resistors 7 and 8 in the first charging circuit and between the resistors 12 and 13 in the second charging circuit are determined so that the stored charge in the capacitors 2 and 3 may compensate for drops of the battery voltage at the time of initiate driving the starter motor 5 to start the engine.

The above electric power supply system operates as follows.

When an ignition switch 15 is turned on to a starter terminal (ST) 15a by a vehicle driver to start the engine, a relay coil 16a of the starter relay 16 is energized to close a relay switch 16b. The starter relay 16 thus energize a switch coil 9a of the electromagnetic switch 9 to turn on the motor contact 10. If the first switching relay 11 is turned off by the ECU 4, that is, if the relay contact 11b is in contact with an OFF terminal 11d, only the battery 1 is operatively connected to the starter motor 5 (field coil 5a and armature coil 5b) to supply the electric power to the starter motor 5 only from the battery 1.

On the other hand, if the first switching relay 11 is turned on by the ECU 4, that is, the relay contact 11b is turned to contact the ON terminal 11c, both the battery 1 and the first capacitor 2 are operatively connected to the starter motor 5 in series to supply the electric power by both the battery 1 and the capacitor 2. However, because the capacitor 2 does not store sufficient charge immediately after ignition switch 15 is turned on to the ST terminal manually by the driver, the switching relay 11 is held turned off by the ECU 4. As long as the relay 11 is held turned off, the first capacitor 2 is connected in parallel to the starter motor 5 and is charged by the battery 1 to the voltage determined by the ratio of resistances of the resistors 7 and 8.

In case that the device switch 17 is turned on after the ignition switch 15 is turned on to the ST terminal, only the battery 1 is connected to the electric device 6 through a diode 18 when the second switching relay 14 is controlled to its turned-off condition by the ECU 4, that is, when the relay contact 14b is in contact with the OFF terminal 14d.

On the other hand, if the second switching relay 14 is controlled to its turned-on condition by the ECU 4, that is, the relay contact 14b is in contact with the ON terminal 14c, both the battery 1 and the capacitor 3 are connected in series to the electric device 6. However, because the capacitor 3 has not been charged sufficiently when the ignition switch 15 is turned on to the ST terminal 15a manually by the driver, the relay 14 is normally controlled to its turned-off condition. In this case, the second capacitor 3 is connected in parallel with the electric device 6 to form the second charging circuit, and is charged by the battery 1 to the voltage determined by the ratio of resistances of the resistors 12 and 13.

Figure 2:
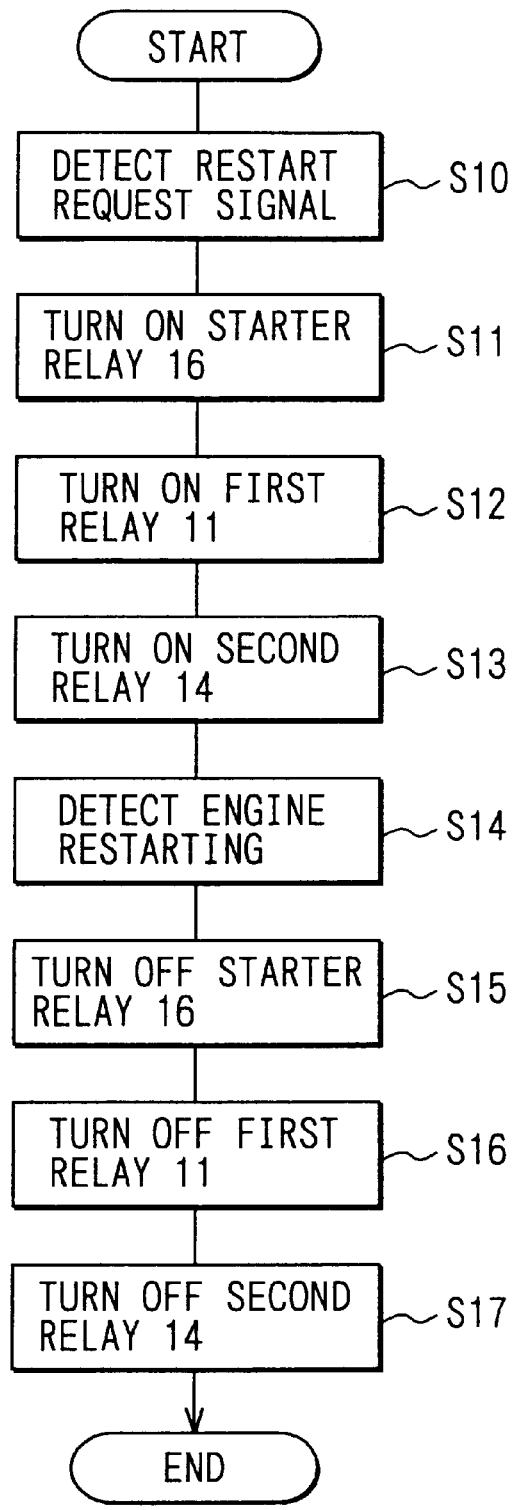
FIG. 2 is a flow diagram showing control processing of an ECU shown in FIG. 1.

The ECU 4 operates as shown in FIG. 2 to automatically supply the electric power to the starter motor 5 when the engine is to be restarted after being automatically stopped at traffic lights or in heavy traffic congestion.

The ECU 4 first detects an engine restart request signal, at step S10. This signal may be generated when an accelerator pedal is pressed down by the driver. The ECU 4 then turns on the starter relay 16, first switching relay 11 and second switching relay 14 by energizing the coils 16a, 11a and 14a by the battery 1 at steps S11, S12 and S13, respectively.

With the starter relay 16 and the first switching relay 11 being turned on, the electromagnetic switch 9 is energized and both the battery 1 and the first capacitor 2 are connected in series with the starter motor 5. Thus, the first capacitor 2 is changed from the first charging circuit to the first discharging circuit. Since the capacitor 2 has been charged before the engine is automatically stopped, the starter motor 5 is readily driven to restart the engine operation with the discharging operation of the first capacitor 2 in addition to the normal power from the battery 1.

Similarly, with the second switching relay 14 being turned on, both the battery 1 and the second capacitor 3 are connected in series with the electric device 6. Thus, the electric device 6 is enabled to operate normally even when the battery voltage drops due to starter motor operation, because the capacitor 3 compensates for the battery voltage drop.

The ECU 4 then detects engine restarting at step S14 by monitoring engine rotation speed. The ECU 4 turns off the starter relay 16, first switching relay 11 and second switching relay 14 at steps S15, S16 and S17, respectively, thereby to complete the automatic engine restarting operation. Both capacitors 2 and 3 are put in the respective charging circuits and charged again for the next discharging operation.

In the above embodiment, it is preferred to disable automatic engine stopping operation of the economy-running system when the capacitors 2 and 3 have not been charged sufficiently. This is because the engine need be automatically restarted without fail with the sufficient electric power from the battery and the capacitors.

As described above, when the engine is started by the starter motor 5, the starter motor 5 and the electric device 6 are supplied with additional capacitor voltages from the capacitors 2 and 3 in addition to the voltage of the battery 1. As a result, the starter motor 5 and the electric device 6 are not adversely affected by the decrease in the battery voltage at the time of driving the starter 5. The capacitors 2 and 3 are limited to have respective capacitance necessary for compensating the battery voltage drop. Therefore, the number and size of the capacitors can be reduced.

What is claimed is:

1. An electric power supply system for an electric load of a vehicle having a battery, comprising:
   a capacitor;
   a charging circuit including resistors that charges the capacitor by dividing a voltage of the battery by the resistors;
   a discharge circuit that applies to the electric load a charged voltage of the capacitor in addition to the voltage of the battery, wherein the discharge circuit is composed of a series circuit of the battery, the capacitor and the electric load; and
   control means that switches connection of the capacitor from the charging circuit to the discharging circuit.

2. The electric power supply system as in claim 1, wherein the charging circuit includes:
   a series resistor that is connected to the battery in series with the capacitor to limit a charging current to the capacitor; and
   a parallel resistor that is connected in parallel with the capacitor and in series with the series resistor to divide the voltage of the battery applied to the capacitor,
   wherein the resistors have respective resistances that define a voltage dividing ratio which provides a capacitor voltage that compensates for a decrease in the voltage of the battery at the time of starting an engine.

3. The electric power supply system as in claim 1, wherein:
   the control means has a switching relay that selectively connects the capacitor to the charging circuit and the discharging circuit, and a control unit that controls a switching operation of the switching relay; and the control unit causes the switching relay to switch the connection of the capacitor from the charging circuit to the discharging circuit when the engine is restarted automatically after being automatically stopped.

4. The electric power supply system as in claim 3, wherein the control circuit disables automatic stopping of the engine until the capacitor is charged to a predetermined level.

5. The electric power supply system as in claim 1, wherein:

the electric load includes a starter motor and an electric device other than the starter motor; and the capacitor, the charging circuit and the discharging circuit are provided for each of the starter motor and the electric device.

\* \* \* \* \*